(12) United States Patent
Watanabe et al.

(10) Patent No.: US 7,684,073 B2
(45) Date of Patent: Mar. 23, 2010

(54) COPY CONTROLLER AND METHOD THEREOF

(75) Inventors: Futoshi Watanabe, Kanagawa (JP); Takashi Yamaguchi, Nagoya (JP)

(73) Assignee: Fujitsu Limited, Kawasaki (JP)

( * ) Notice: Subject to any disclaimer, the term of this patent is extended or adjusted under 35 U.S.C. 154(b) by 1129 days.

(21) Appl. No.: 11/174,493

(22) Filed: Jul. 6, 2005

(65) Prior Publication Data
US 2006/0129773 A1 Jun. 15, 2006

(30) Foreign Application Priority Data
Dec. 10, 2004 (JP) .............................. 2004-358368

(51) Int. Cl.
*G06F 15/00* (2006.01)
*G06F 21/00* (2006.01)
(52) U.S. Cl. ..................................... 358/1.15; 711/162
(58) Field of Classification Search ................ 358/1.15, 358/1.19, 1.13, 1.14, 1.16, 1.17, 1.18; 709/203, 709/204, 206, 223, 205; 707/1, 2, 5, 7, 100, 707/104.1, 101, 102, 10; 711/162, 163, 147, 711/152, 161, 203; 455/517, 90.3, 556.2, 455/152; 370/238, 252, 254
See application file for complete search history.

(56) References Cited

U.S. PATENT DOCUMENTS

| 5,263,154 A | 11/1993 | Eastridge et al. |
|---|---|---|
| 6,092,066 A | 7/2000 | Ofek |
| 6,434,681 B1 * | 8/2002 | Armangau .................. 711/162 |
| 2004/0024961 A1 | 2/2004 | Cochran et al. |

FOREIGN PATENT DOCUMENTS

| EP | 0 939 371 A2 | 9/1999 |
|---|---|---|
| JP | 6-83677 | 3/1994 |
| JP | 11-242566 | 9/1999 |
| JP | 11-345158 | 12/1999 |
| JP | 2001-166974 | 6/2001 |
| JP | 2006-527873 | 12/2006 |
| WO | 2004/114136 A2 | 12/2004 |

OTHER PUBLICATIONS

European Office Action mailed May 7, 2009 and issued in corresponding European Patent Application 05 251 782.8.
European Search Report issued in corresponding European Patent Application No. 05251782.8 on Nov. 7, 2008.
Japanese Office Action issued on Apr. 7, 2009 in corresponding Japanese Patent Application 2004-358368.

* cited by examiner

*Primary Examiner*—Saeid Ebrahimi Dehkordy

(57) ABSTRACT

After a first copy request is received and copy operation from a copy source area to a copy destination area is activated, information indicating an update section is recorded when a data update of at least one of either the copy source area or the copy destination area is generated. When a second copy request is received, data in the copy source area corresponding to the update section is copied to the copy destination area, in accordance with the recorded information.

12 Claims, 20 Drawing Sheets

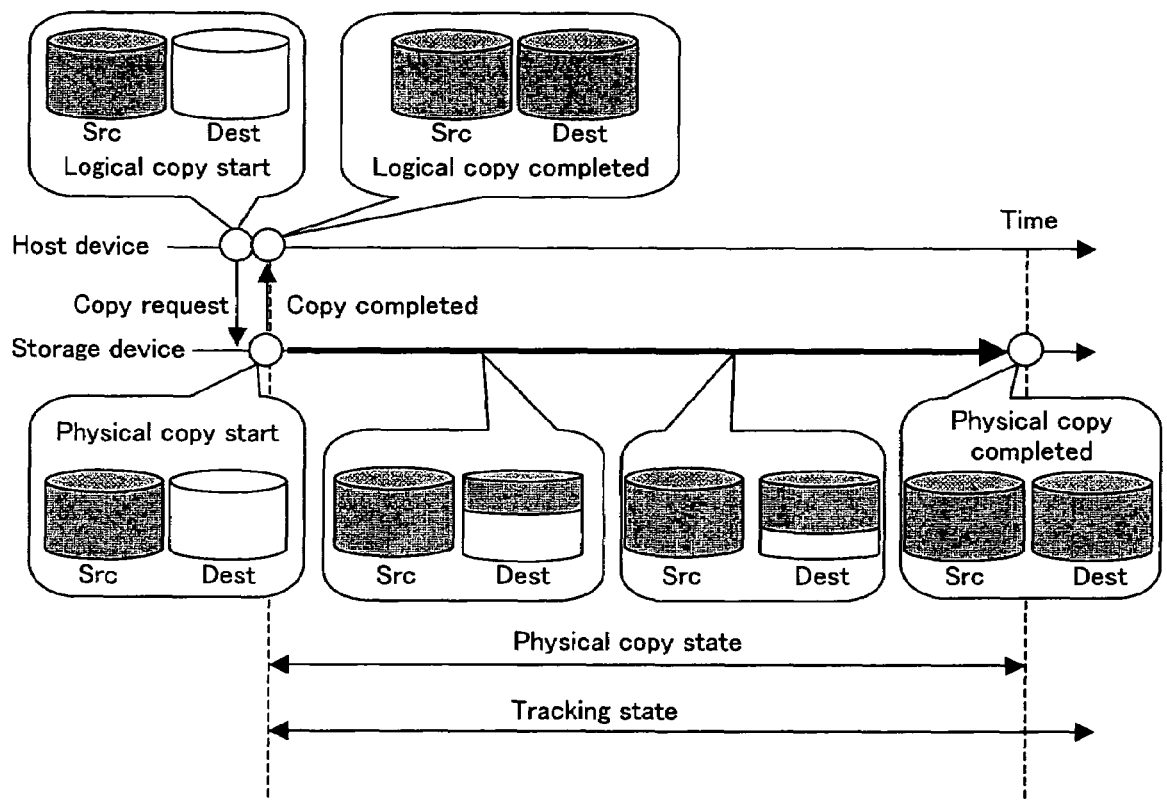
F I G. 2 B

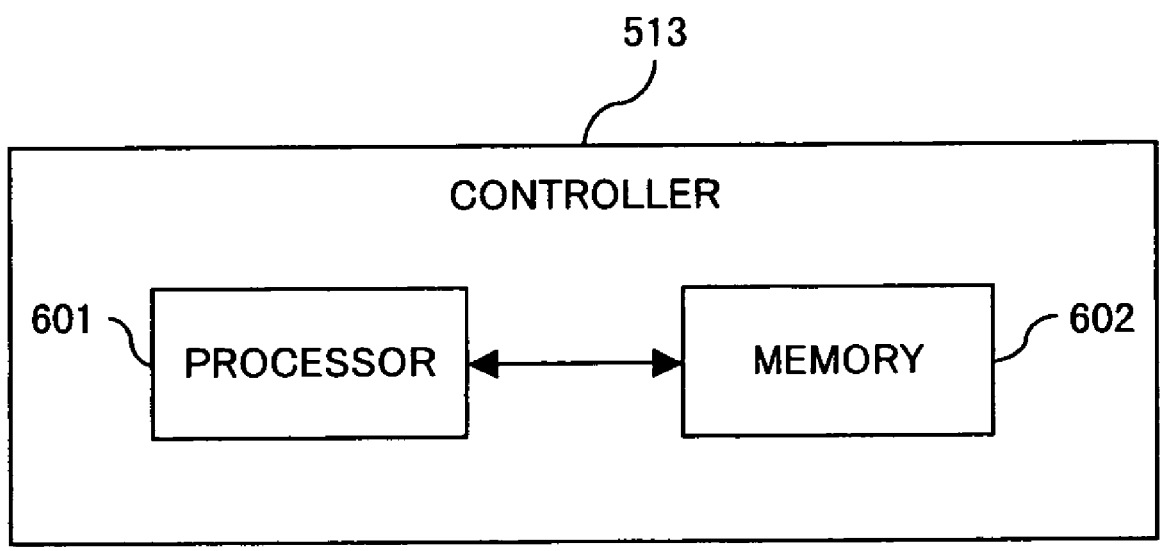
F I G. 6

Copy bit map
1111 1111 1111 1111 1111 1111 1111 1111

Scr tracking bit map
0000 0000 0000 0000 0000 0000 0000 0000

Dest tracking bit map
0000 0000 0000 0000 0000 0000 0000 0000

F I G. 7

Copy bit map
0000 0000 1111 1111 1111 1111 1111 1111

Scr tracking bit map
0000 0000 0000 0000 0000 0000 0000 0000

Dest tracking bit map
0000 0000 0000 0000 0000 0000 0000 0000

F I G. 8

Copy bit map
0000 0000 1111 1111 1111 1111 1111 1111
Scr tracking bit map
0000 1000 0000 0000 0000 0000 0000 0000
Dest tracking bit map
0000 0000 0000 0000 0000 0000 0000 0000
F I G. 9

Copy bit map
0000 0000 1111 1111 1111 1011 1111 1111

Scr tracking bit map
0000 1000 0000 0000 0000 0100 0000 0000

Dest tracking bit map
0000 0001 0000 0000 0000 0000 0000 0000

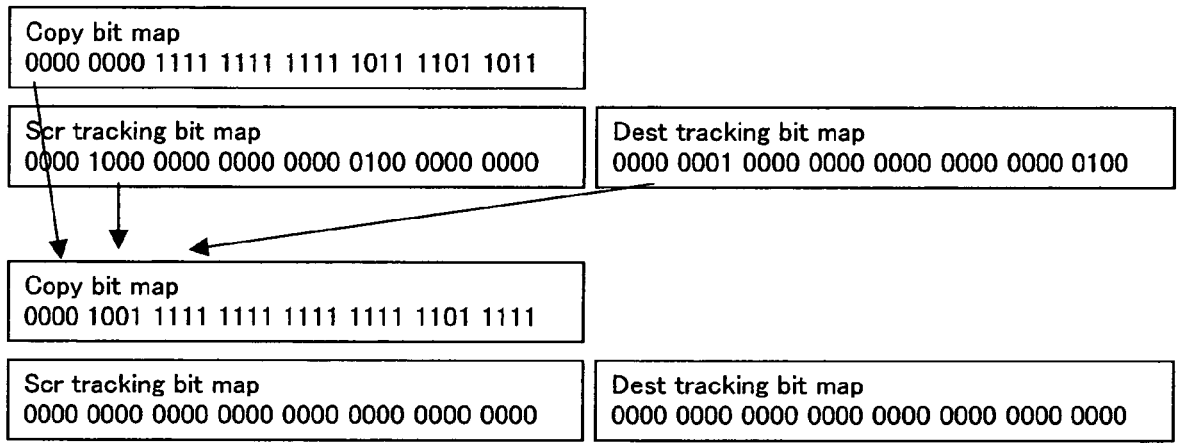
F I G. 14

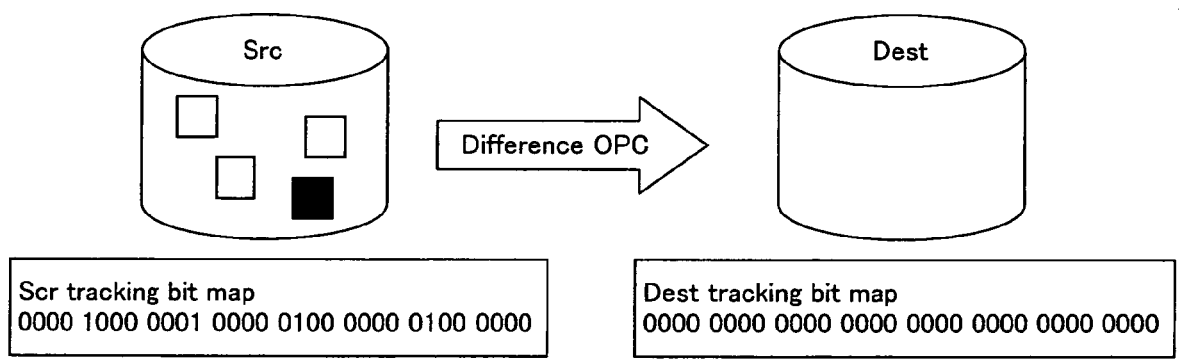
F I G. 1 5

COPY CONTROLLER AND METHOD THEREOF

BACKGROUND OF THE INVENTION

1. Field of the Invention

The present invention relates to a device which controls a copy operation for preparing a copy of data at a designated time in a storage device in accordance with an instruction from a host device, and a method thereof.

2. Description of the Related Art

As conventional methods for preparing a copy of data stored in a storage device (disk array device) which has one or more magnetic disk devices (disk drives), the following two methods exist:

(1) Method of Copying Through the Host Device

In this method, as shown in FIG. 1A, a host device 11 reads the data to be copied from a copy source logical unit 21 and writes this data to a destination logical unit 22. The logical unit is equivalent to a volume in a main frame system and is equivalent to a slice or a partition in an open system.

(2) Method of Copying From the Storage Device

In this method, as shown in FIG. 1B, the host device 11 issues a copy instruction to the storage device 12. Upon receiving the instruction, the storage device 12 reads the data to be copied from the logical unit 21 and writes the data onto the logical unit 22.

Thus, functions for performing a copy operation in a storage device are generally known, a function called OPC (One Point Copy) wherein this function is extended is also proposed (for example, see Japanese Laid Open Patent No. 2001-166974). The OPC operates according to the following steps, as shown in FIG. 1C.

1. The storage device receives a copy instruction from the host device.

2. The storage device assumes that the data copy was logically completed when the copy instruction was issued and immediately executes a copy completion response to the host device.

3. The storage device physically copies the actual data from the copy source logical device to the copy destination logical device after executing the copy completion response.

4. The storage device executes the following actions in regards to read/write access from the host device to an area wherein the copying of the actual data is not completed.

A. Read access to an un-copied area of copy source: The storage executes normal operation, that is, the actual data is read normally.

B. Write access to an un-copied area of copy source: After the existing data is copied to the copy destination, the designated actual data is written.

C. Read access to an un-copied area of copy source: After the actual data is copied from the copy source, the copied data is read.

D. Write access to an un-copied area of copy source: The designated actual data is written as is. Thereafter, this area is designated as already copied By executing such operations, the time required for a copy operation, namely which is just until the response in item 2, described above, is returned to the host device, seems to become very short on the host device side. For example, even a copy of giga-bytes of data seems to take only several seconds to complete.

Japanese Laid Open Patent No. 11-345158 relates to a method of obtaining a dump in an information processing system comprising a disk device.

The following problem exists in copy control operation of the afore-mentioned conventional storage device.

OPC is a function which copies a snap shot of the entire or a part of the designated logical device (copy source, hereinafter referred to as Src) to the designated logical unit (copy destination, hereinafter referred to as Dest). In OPC, the physical copying of the entire designated range is executed at every booting up time is executed from Src to Dest. Since the load to the controller and the magnetic disk device is so heavy during physical copying that the performance of the entire storage device deteriorates, in comparison with when physical copying is not in process

SUMMARY OF THE INVENTION

The objective of the present invention is to reduce the load when the storage device executes a copy operation and to prevent performance deterioration of the entire storage device.

The copy controller according to the present invention comprises a storage device and a processing device and controls the data copying operation wherein the data is copied from the copy source area to the copy destination area.

After receiving a first copy request and initiating a copying process from the copy source area to the copy destination area, if a data update is generated in at least one of either the source area or the destination area, the storage device stores information indicating the update section. The processing device records the information indicating the update section to the storage device and controls the data copying operation wherein the data is copied from the copy source area corresponding to the update section to the copy destination area, based on the information stored in the storage device, when a second copy request is received.

BRIEF DESCRIPTION OF THE DRAWINGS

FIG. 2B is a diagram showing the operations at the time of a copy request;

FIG. 6 is a configuration diagram of the controller;

FIG. 7 is a diagram showing the bitmap in the initial state;

FIG. 8 is a diagram showing the bitmap in a first state;

FIG. 9 is a diagram showing the bitmap in a second state;

FIG. 14 is a diagram showing a merge of the bitmaps;

FIG. 15 is a diagram showing the difference in OPC;

DESCRIPTION OF THE PREFERRED EMBODIMENTS

Figure 1A:
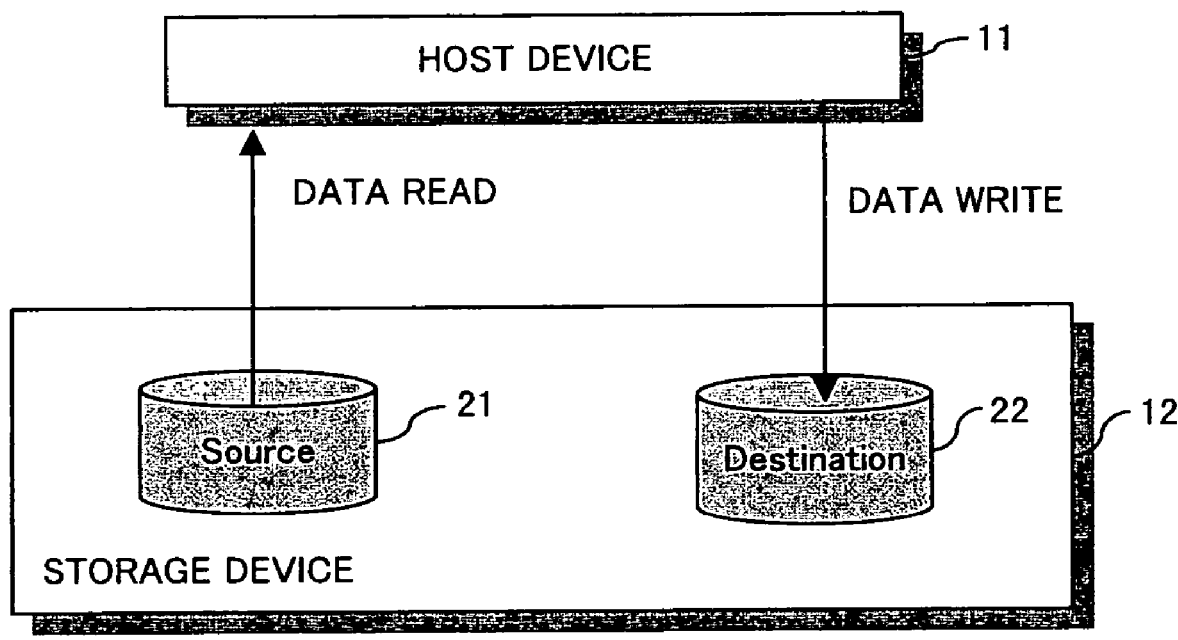
FIG. 1A is a diagram showing a copy through the host device.
Figure 1B:
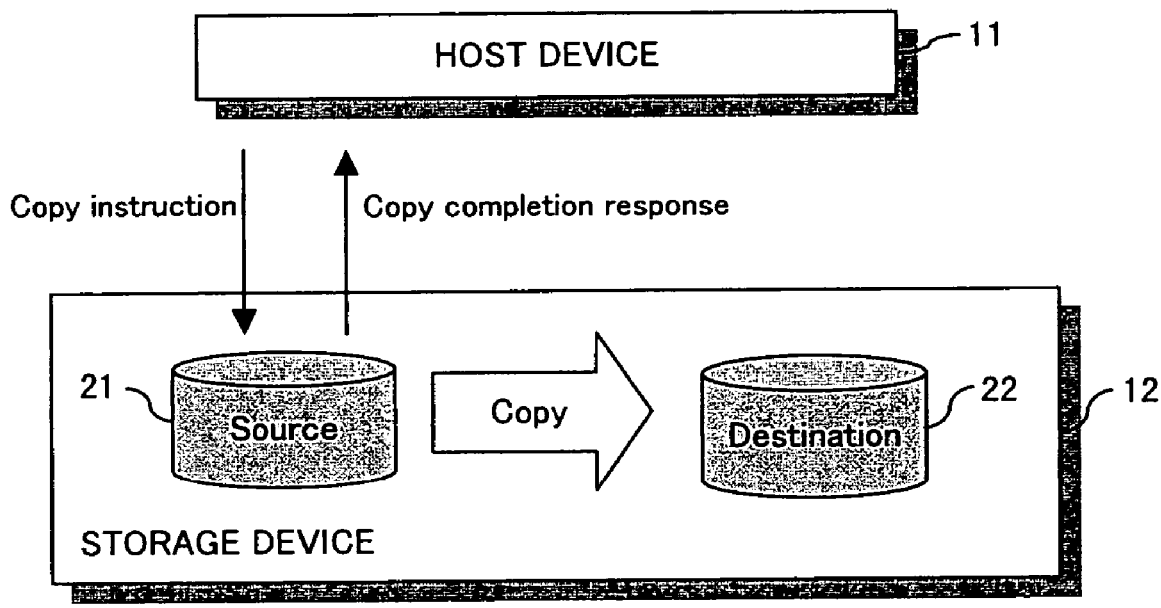
FIG. 1B is a diagram showing a copy by the storage device.
Figure 1C:
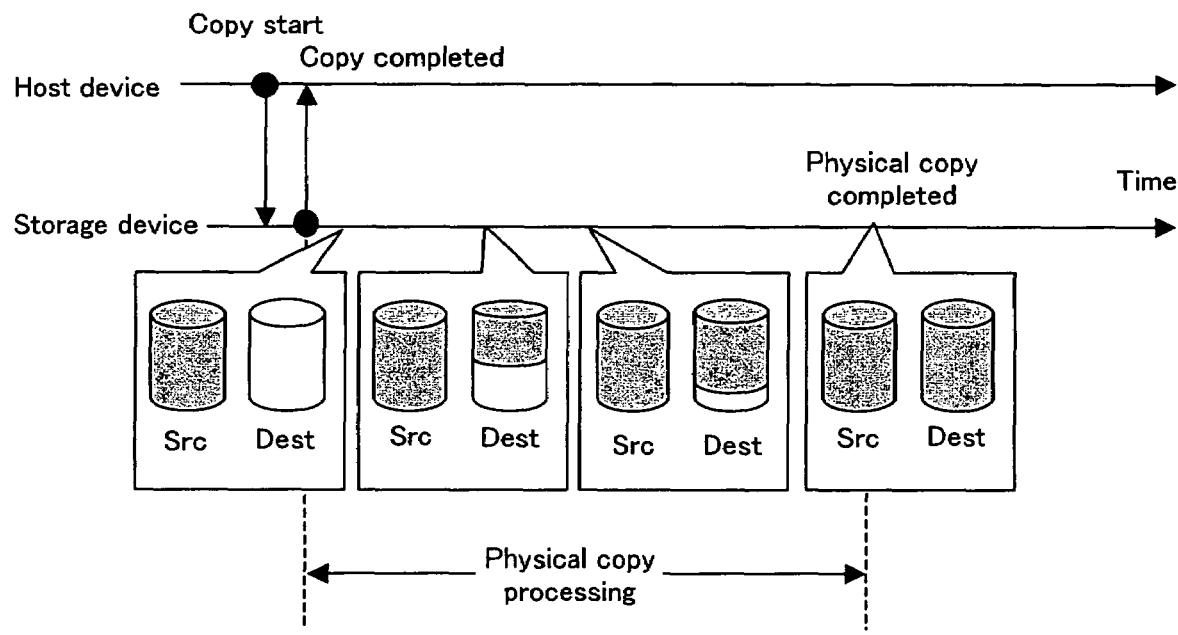
FIG. 1C is a diagram showing OPC.
Figure 2A:
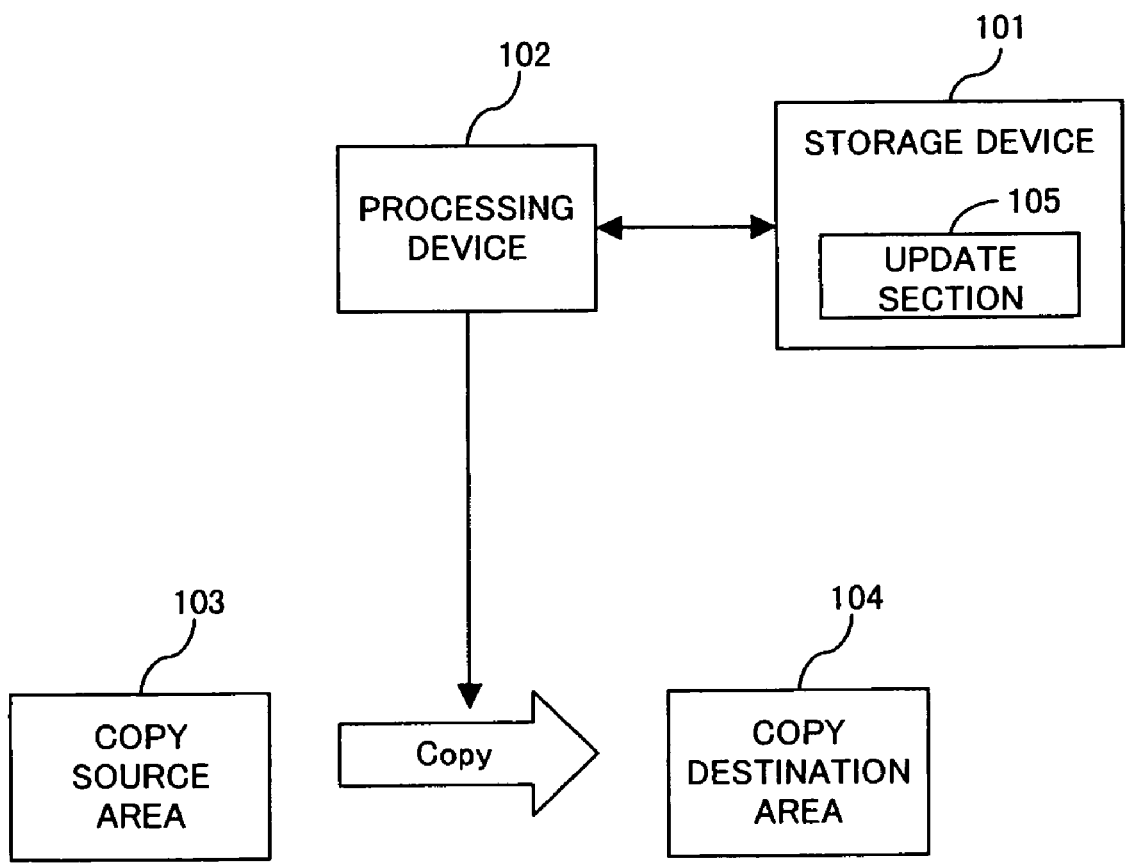
FIG. 2A is a principle diagram of a copy controller according to the present invention.

FIG. 2A is a principle diagram of a copy controller according to the present invention. The copy controller in FIG. 2A comprises a storage device 101 and a processing device 102 and controls the data copying operation wherein the data is copied from a copy source area 103 to a copy destination area 104.

The storage device 101 stores information 105 which shows the update section when a data update of at least one of either the copy source area 103 or the copy destination area 104 is generated, after the first copy request is received and a copying process from the source area 103 to the destination area 104 is activated. The processing device 102 controls the copying operation wherein the data is copied from the copy source area 103 corresponding to the update section to the destination area 104, based on information 105 stored in the storage device 102, when it records the information indicating the update section in the storage device 101 and receives a second copy request.

When the processing device 101 receives the first copy request, it activates copying data from the copy source area 103 to the copy destination area 104, and records the update section of the data update generated thereafter in the storage device 101. Then, when it receives a second copy request, it initiates the data copying operation wherein the data is copied from the copy source area 103 corresponding to the recorded update section to the copy destination area 4.

With the control as such, a physical copying can be executed only for the data of the updated area after the previous copying is initiated, when a second copy request for the same pair of copy source area 103 and copy destination area 104 as that when the first copy request is issued.

The storage device 101 and the processing device 102 correspond to, for example, the memory 602 and the processor 601 of FIG. 6 described later, respectively, and the source area 103 and the destination area 104 correspond to, for example, the afore-mentioned Src and Dest, respectively.

Generally, if the same logical device is periodically backed up, it is unnecessary to perform a physical copy of the entire Src every time, and if physical copying process can copy only the data which differs from the one at the time of previous copy operation, a physical copying time is expected to be reduced.

According to the present invention, physical copying of only the data which differs from that in the previous copy operation can be performed, and the actual copying time is reduced. Therefore, the load to the controller and the magnetic disk device during the execution of physical copying can be reduced, and performance deterioration of the entire storage device is prevented.

In the present embodiment, the function for recording update information based on the previous copy and then copying only the differences in the data (hereinafter referred to as the difference copy function) is realized. The features of the difference copy function are as follows:

(1) Copying operation finishes instantaneously (instantaneous completion of logical copying).

(2) After logical copying is completed, Src and Dest assure the read/write operations to all hosts which can recognize a volume form, as a respective volume of the same contents.

(3) After logical copying is completed, physical copying is activated in the background. Hereinafter, this state is referred to as the physical copy state (see FIG. 2B).

(4) Even if a write request to the area to be copied on the Src-side is generated while physical copying is performed, the operation is performed so as to enable the content of Src at the time of the copy request receipt to be copied on the Dest side.

(5) Even if a read request over the area to be copied onto the Dest-side is generated before physical copying has been completed, the operation is performed so as to enable the same content as that of the Src at the time of the copy request receipt to be read.

(6) After logical copying is completed, if a write request over Src or Dest is generated, the update section is recorded accordingly. Hereinafter, the state wherein the update section is recorded is referred to as the tracking state (see FIGS. 2B and 3).

Figure 3:
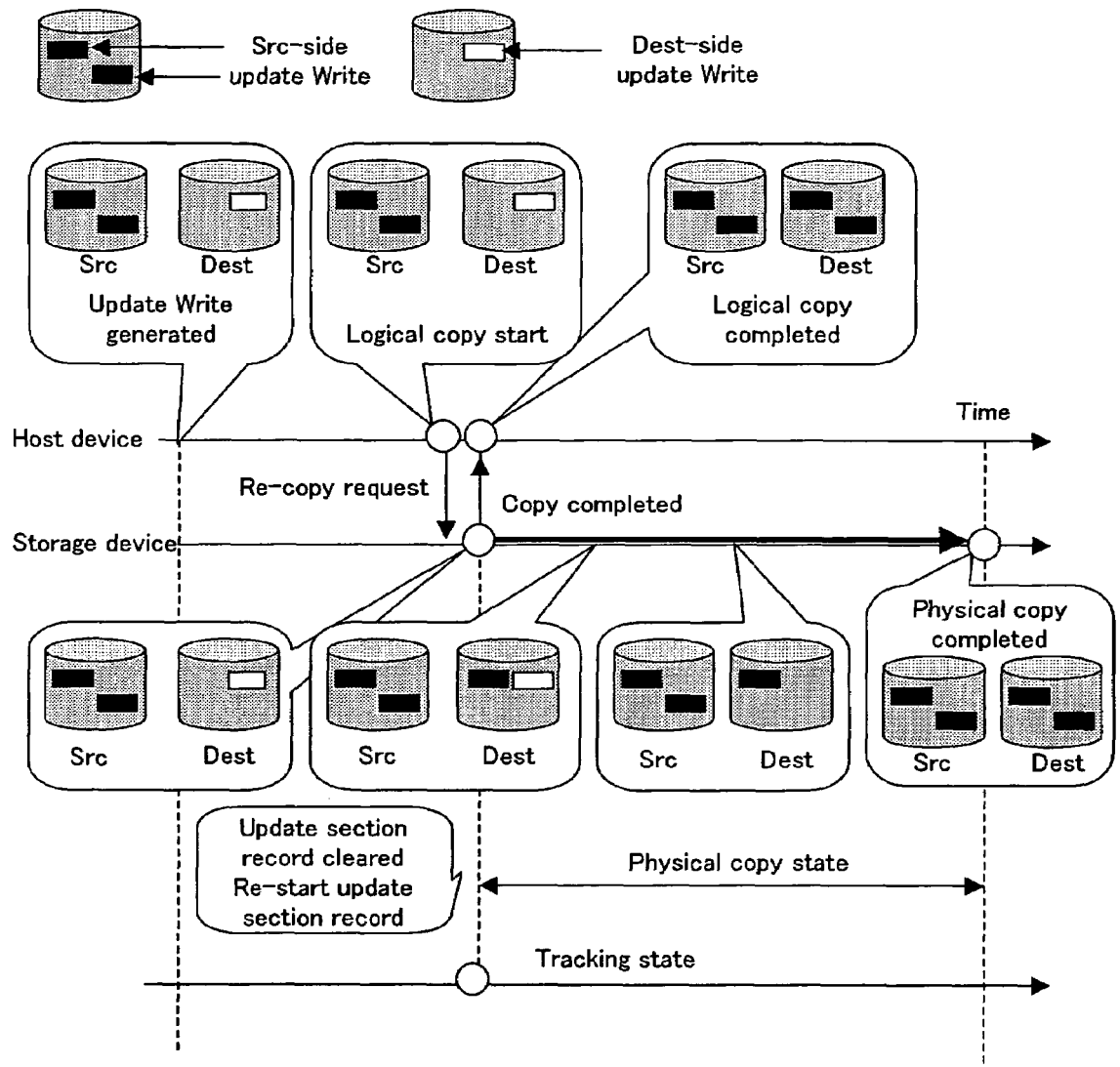
FIG. 3 is a diagram showing the operations at the time of a re-copy request.

(7) A logical pairing of Src and Dest continues as is in the tracking state even after physical copying is completed (see FIGS. 2B and 3).

(8) Only the data of the update section generated in the previous logical copying process is copied from the Src-side to the Dest-side (see FIG. 3) by a re-copy request. At the same time, the recorded data of update sections up to the time of the re-copy request is cleared and the data recording of the update section begins again. In addition, the data of the update section on the Dest-side is overwritten by the data on the Src-side by the re-copy request. Furthermore, the re-copy request can be allowed during physical copying.

Figure 4:
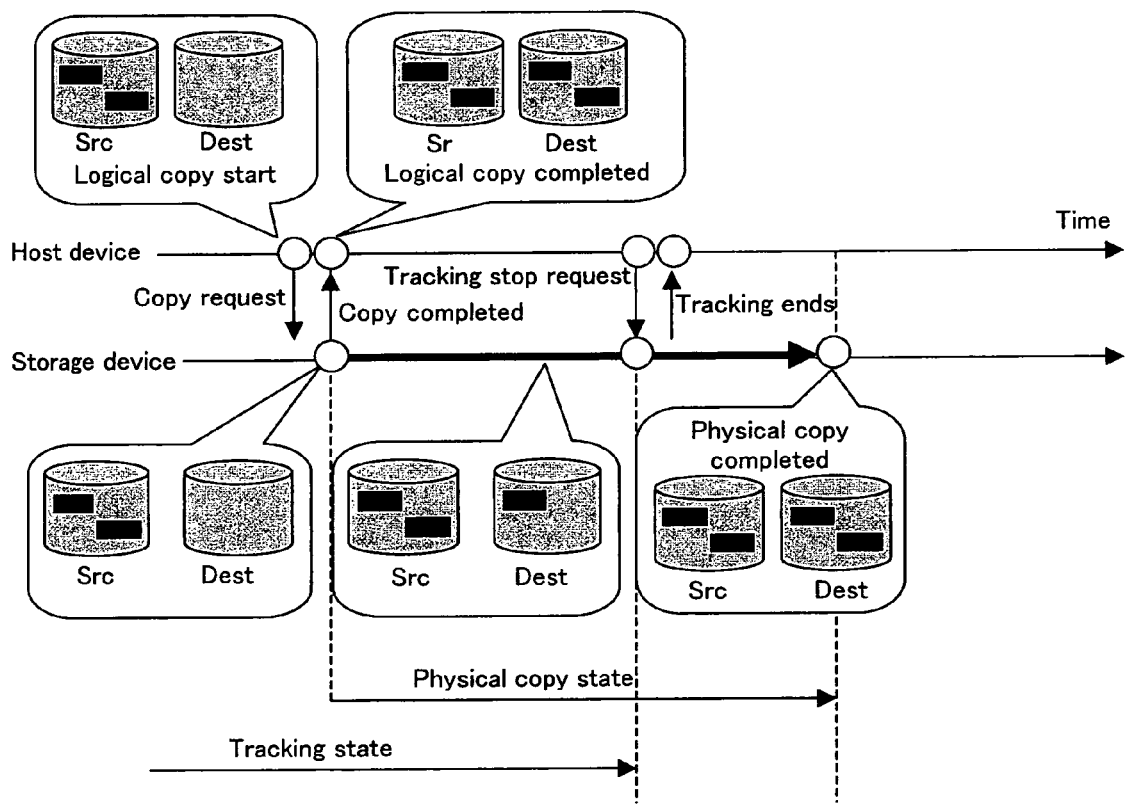
FIG. 4 is a diagram showing the operations after a tracking stop request.

(9) The tracking state ends and the logical pair is dissolved (see FIG. 4) by the tracking stop request. If physical copying is being executed, the logical pairing is immediately cancelled soon after physical copying is completed.

The afore-mentioned (1) to (5) are the same functions as that of the conventional OPC, and the afore-mentioned (6) to (9) are the features unique to the difference OPC.

Figure 5:
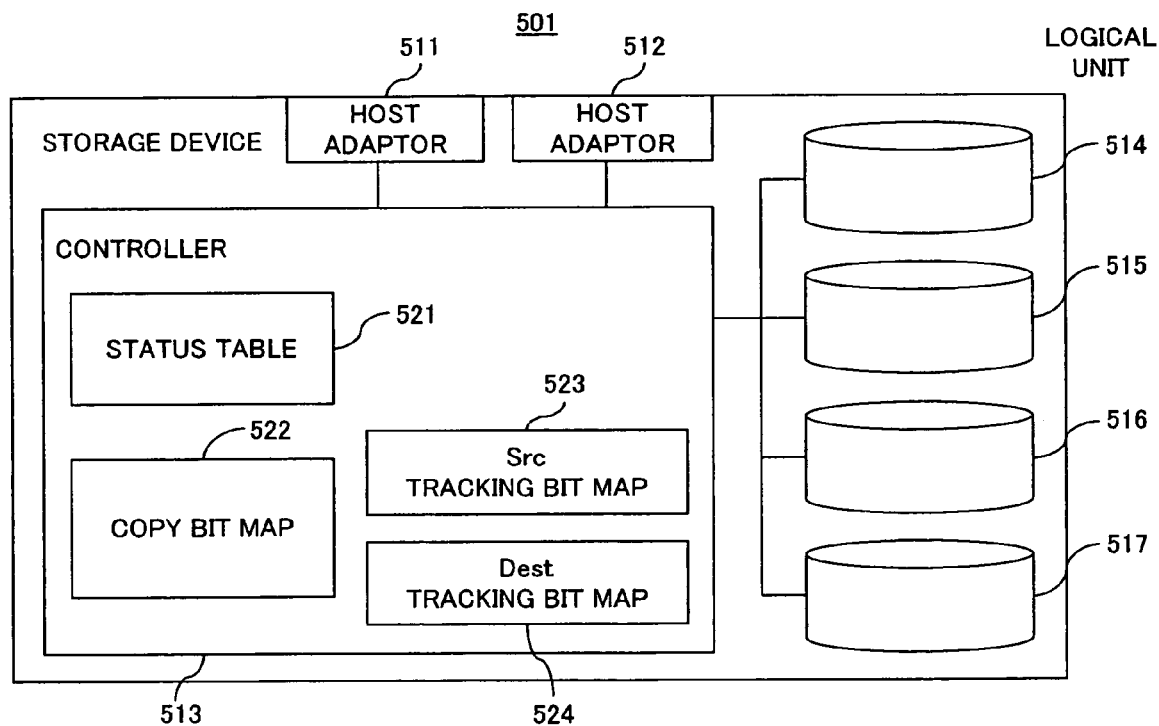
FIG. 5 is a configuration diagram of the storage device.

FIG. 5 is a configuration diagram of a storage device such as described above. The storage device 501 shown in FIG. 5 comprises host adaptors 511 and 512, a controller 513 and logical devices 514 to 517. Each logical device is equivalent to the entire or a part of the data area of one magnetic disk device or more. The number of the logical devices is not necessarily limited to 4.

As shown in FIG. 6, the controller 513 comprises a processor 601 and a memory 602 and controls the accesses to the logical devices 514 to 517. The memory 602 stores the programs and data which are used by the processor 601, and the processor 601 performs necessary processing by executing the programs using the memory 602.

In the memory 602, a status table 521, a copy bitmap 522, a Src tracking bitmap 523 and a Dest tracking bitmap 524 are stored as control information. The status table 521 is a control table which manages the copy state, and the copy bitmap 522 is a bitmap for controlling physical copying. The Src tracking bitmap 523 and Dest tracking bitmap 524 are the bitmaps for recording the position changes on the Src-side and on the Dest-side, respectively.

The bitmaps 522 to 524 are the data for controlling the number of bits which are equivalent to the number of the data positions within the logical device. In the copy bitmap 522, logical "1" indicates a data position wherein the physical copy is not completed yet, and logical "0" indicates a data position wherein the physical copying is completed. In the tracking bitmaps 523 and 524, logical "1" indicates a data position which has changed since the tracking started, and logical "0" indicates a data position which has not changed.

The host adaptors 511 and 512 receive the request from the host device, transfer the same to the controller 513, and send the response generated by the controller 513 to the host device. The host adaptors 511 and 512 can be connected to the same host device in a redundant configuration or can be connected to individual host devices.

The storage device 501 recognizes the following commands as an external interface for the copy process control.

(1) Start command (Start)

(2) Restart command (Restart)

(3) Tracking stop command (Tracking stop)

(4) Stop command (Stop)

(5) State indication command (Query)

Sequentially described below are the operations of the storage device 501 when these commands are received from the host device.

(1) Start Command

The controller 513 secures the areas for the status table 521, the copy bitmap 522, the Src tracking bitmap 523, and the Dest tracking bitmap 524 in the memory 602 and acknowledges the completion of the logical copying. Control information such as Src and Dest logical device numbers (LUN) are registered in the status table 521. As shown in FIG. 7, the initial value of the copy bitmap 522 is determined to be ALL1 (all bits are set to logical "1"), and those of the tracking bitmaps 523 and 524 are determined to be ALL0 (all bits are set to logical "0").

Thereafter, the controller 513 starts the physical copy in the background.

(a) Physical copying from Src to Dest is performed regarding the data corresponding to the bit of "1" in the copy bitmap 522. In this case, as shown in FIG. 8, the bits corresponding to the copied area are changed from "1" to "0" in the copy bitmap 522.

(b) When a read request over the already copied area in Src is received, the data is read from Src. The bitmaps 522 to 524 are not updated.

(c) When a write request to the already copied area in Src is received, the bits of the corresponding positions in the Src tracking bitmap 523 are changed from "0" to "1" after Src writes the data, as shown in FIG. 9.

(d) When a read request to the un-copied area in Src is received, the data is read from Src. The bitmaps 522 to 524 are not updated.

Figure 10:
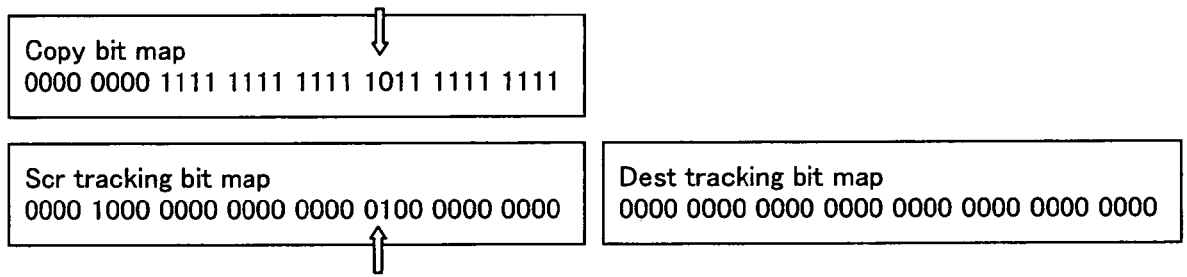
FIG. 10 is a diagram showing the bitmap in a third state.

(e) When a write request to the non-copied area in Src is received, the bits of the corresponding positions in the copy bitmap 522 are changed from "1" to "0" after physical copying from Src to Dest is performed, as shown in FIG. 10. Thereafter, Src writes the data, and the bits of the corresponding positions in the Src tracking bitmap 523 are changed from "0" to "1".

That is, the destination positions in the tracking bitmap are changed from "0" to "1".

(f) When a read request to the already copied area in Dest is received, the data is read from Dest. The bitmaps 522 to 524 are not updated.

Figure 11:
FIG. 11 is a diagram showing the bitmap in a fourth state.

(g) When a write request to the already copied area in Dest is received, the bits of the corresponding positions in the Dest tracking bitmap 524 are changed from "0" to "1" after Dest writes the data, as shown in FIG. 11.

Figure 12:
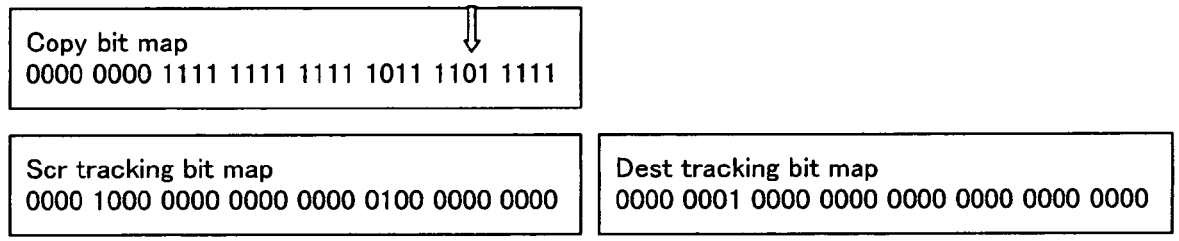
FIG. 12 is a diagram showing the bitmap in a fifth state.

(h) When a read request to the un-copied area in Dest is received, after physical copying is performed from Src to Dest and the data is read from Dest, as shown in FIG. 12, the bits of the corresponding positions in the copy bitmap 522 are changed from "1" to "0".

Figure 13:
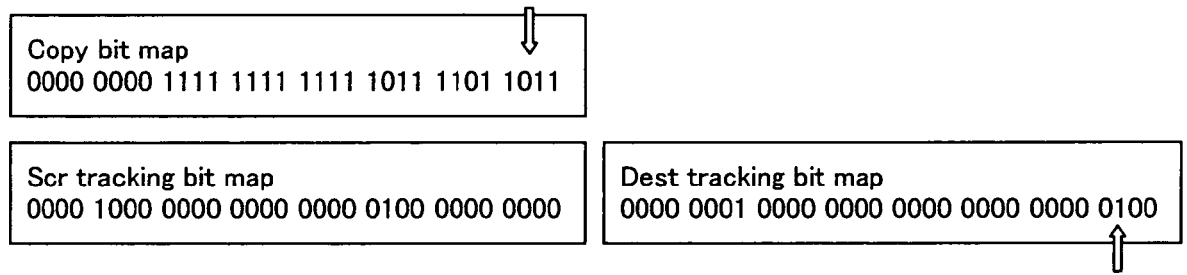
FIG. 13 is a diagram showing the bitmap in a sixth state.

(i) When a write request to the un-copied area in Dest is received, the bits of the corresponding positions in the copy bitmap 522 are changed from "1" to "0", the bits of the corresponding positions in the Dest tracking bitmap 524 are changed from "0" to "1" after Dest writes the data, as shown in FIG. 13. It is unnecessary to perform physical copying from Src to Dest.

(2) Restart Command (a) If the previous physical copying is completed, the copy bitmap 522 is determined to be ALL0. In this case, the controller 513 sets the copy bitmap 522 to the merged result of Src tracking bitmap 523 with Dest tracking bitmap 524 by logical sum calculation. Thereafter, the Src tracking bitmap 523 and Dest tracking bitmap 524 are set to ALL0 and physical copying is started. The subsequent operations are the same as that in (a) to (i) of the start command.

(b) If the previous physical copying is not completed, some of the bits in the copy bitmap 522 remain set to "1". In this case, the controller 513 sets the copy bitmap 522 with the merged result of the copy bitmap 522, with Src tracking bitmap 523 and Dest tracking map 524 by logical sum calculation, as shown in FIG. 14. Thereafter, as in the case of the aforementioned (a), the Src tracking bitmap 523 and Dest tracking bitmap 524 are reset to ALL0, and physical copying is started.

(3) Tracking Stop Command (a) If physical copying has been completed, the controller 513 releases all the control information and terminates the copy processing.

(b) If physical copying is not completed, the controller 513 releases the Src tracking bitmap 523 and Dest tracking bitmap 524. Physical copying continues in accordance with the copy bitmap 522, and when the copy of all areas is completed, the controller 513 releases the status table 521 and the copy bitmap 522, and terminates the copy processing.

(4) Stop Command

The controller 513 releases all control information, and terminates the copy process. If the physical copy is not completed, the integrity of the data on the Dest-side is not secured.

(5) Status Indication Command

The controller 513 notifies the host device of the following information regarding the copy process under execution.
    LUN of Src
    LUN of Dest
    Progress status of physical copying
    Whether or not there is tracking Next, described below is an extended application of the difference copy function. As shown in FIG. 15, if back-up data is prepared by the difference OPC from Src to Dest, when data damage occurs due to software factors or human operational errors, rather than a hardware factors the data can be recovered by switching Src and Dest to each other and booting up OPC.

Figure 16:
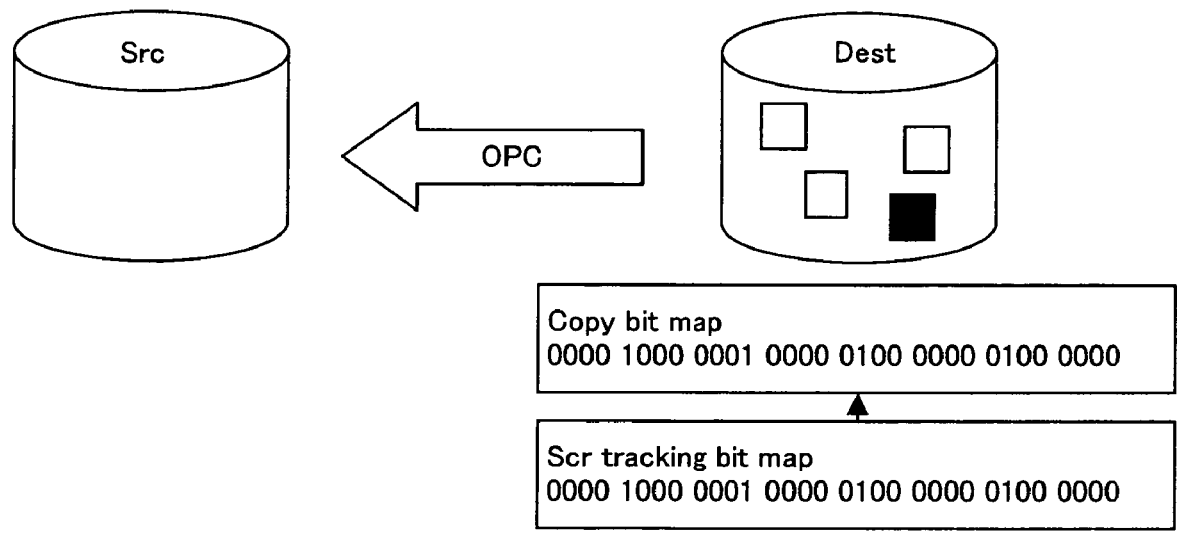
FIG. 16 is a diagram showing the recovery of data.

In this case, the update section caused by the data damage after the back-up data has been created is recorded in the Src tracking bitmap 523. Then, the OPC wherein Src and Dest are switched to each other is judged to be "OPC for data restoration", and the OPC from Dest to Src is booted as shown in FIG. 16.

At this time, the controller 513 sets the data of the Src tracking bitmap 523 on it as the initial value of the copy bitmap 522 and copies only the update section in Src from Dest to Src, thereby enabling the recovery of only the damaged data using the data in Dest and thus shortening the time required for physical copying, in comparison with the recovery methods wherein all data is copied.

Figure 17:
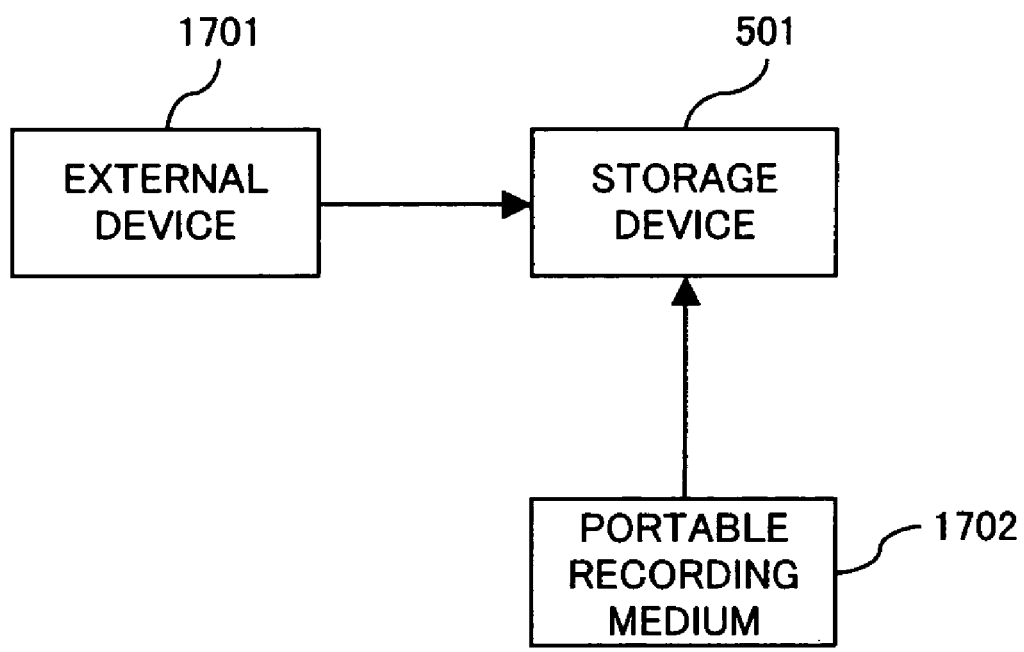
FIG. 17 is a diagram showing a method for providing the program and data.

FIG. 17 shows a method for providing the programs and data which the processor 601 of the controller 513 uses for processing. The programs and data stored in the external device 1701 and the portable recording medium 1702, such as information processors, are loaded into the memory 602 of the controller 513 within the storage device 501.

The external device 1701 generates a carrier signal which carries the programs and data and transmits the same to the storage device 501 through an arbitrary transmission medium on a communication network. The portable recording medium 1702 is an arbitrary computer readable recording medium such as a memory card, a flexible disk, an optical disk, a magneto-optical disk or the like. The processor 601 executes the program by using the data to implement the necessary processing.

Although a magnetic disk device is used in the storage device 501 shown in FIG. 5, the present invention is also applicable to other disk devices such as optical disks and magneto-optical disks or to storage devices to which other memory devices, such as a tape device, are connected.

In addition, it is unnecessary for the controller 513 to comprise both a Src tracking bitmap 523 and a Dest tracking bitmap 524, the difference copy function can also be realized by using a single tracking bitmap.

For example, if back-up data is prepared, since the data in Dest is not usually updated, it is therefore sufficient if the controller comprises a tracking bitmap which records the update section in Src. In addition, if the update sections in Src and Dest are recorded in the same tracking bitmap, it is unnecessary to merge two tracking bitmaps when the restart command is received.

What is claimed is:

1. A copy controller for controlling a data copying operation wherein data is copied from a copy source area to a copy destination area, comprising:
a storage device which stores copy control information indicating the copy source area to be copied and updated information indicating an updated section when a data update of the copy source area is generated after a first copy request is received and a first data copying operation from the copy source area to the copy destination area is activated; and
a processing device which initiates a second data copying operation wherein data is copied from the copy source area corresponding to the updated section to the copy destination area, based on a merged result of the copy control information and the updated information stored in the storage device, when information indicating that the updated section is recorded into the storage device and a second copy request which indicates a data copying operation from the copy source area to the copy destination area is received after the first copy request.

2. A copy controller according to claim 1, wherein said processing device initiates the first data copying operation wherein data is copied from said copy source area to said copy destination area after acknowledging a completion of copy when said first copy request is received and records the information indicating the updated section of the data update generated after acknowledging the completion of copy to said storage device.

3. A copy controller according to claim 1, wherein said processing device continues processing for recording the information indicating said updated section even after the first copying operation based on said first copy request is completed.

4. A copy controller according to claim 3, wherein said processing device terminates the processing for recording the information indicating said updated section when a recording stop request is received.

5. A copy controller according to claim 1, wherein said processing device starts processing for recording the information indicating the updated section of the data update newly generated in said storage device after the second copying operation based on the second copy request is activated.

6. A copy controller according to claim 1, wherein said storage device stores copy source tracking information, indicating the updated section of said copy source area, and copy destination tracking information, indicating the updated section of said copy destination area, and said processing device initiates the second data copying operation wherein data corresponding to the copy source tracking information and the data corresponding to the copy destination tracking information are copied from the copy source area to the copy destination area, when said second copy request is received after the first copying operation based on the first copy request is completed.

7. A copy controller according to claim 1, wherein said storage device stores copy source tracking information, indicating the updated section in said copy source area, and copy destination tracking information, indicating the updated section in the copy destination area, and said processing device initiates the second copying operation, wherein data of which copy has not been completed, data corresponding to the copy source tracking information and data corresponding to the copy destination tracking information are copied from the copy source area to the copy destination area, when said second copy request is received while the first copying operation based on said first copy request has not been completed.

8. A copy controller according to claim 1, wherein said processing device initiates a third copying operation wherein data corresponding to the updated section in the copy source area is copied from the copy destination area to the copy source area, when data recovery is performed in the copy source area.

9. A storage device, comprising:
a copy source area;
a copy destination area;
a receiving device for receiving copy requests;
a storage device which stores copy control information indicating the copy source area to be copied and updated information indicating an updated section when a data update of the copy source area is generated after a first copy request is received and a first data copying operation from the copy source area to the copy destination area is activated; and
a processing device which initiates a second data copying operation wherein data is copied from the copy source area corresponding to the updated section to the copy destination area, based on a merged result of the copy control information and the updated information stored in the storage device, when the information indicating the updated section is recorded to the storage device and a second copy request which indicates a data copying operation from the copy source area to the copy destination area is received after the first copy request.

10. A computer-readable medium storing a program for a processor which controls a data copying operation wherein data is copied from a copy source area to a copy destination area is recorded, and the program enables the processor to execute processing for:

recording copy control information indicating the copy source area to be copied and updated information indicating an undated section when a data update of the copy source area is generated after a first copy request is received and a first data copying operation from the copy source area to the copy destination area is activated; and copying data from said copy source area corresponding to the updated section to said copy destination area in accordance with a merged result of the copy control information and the undated information, when a second copy request which indicates a data copying operation from the copy source area to the copy destination area is received after the first copy request.

11. A copy control method for controlling a data copying operation wherein data is copied from a copy source area to a copy destination area, wherein:

copy control information indicating the copy source area to be copied and updated information indicating an updated section is recorded when a data update of the copy source area is generated after a first copy request is received and a first data copying operation from the copy source area to the copy destination area is activated; and data in said copy source area corresponding to the updated section is copied to said copy destination area in accordance with a merged result of the copy control information and the updated information, when a second copy request which indicates a data copying operation from the copy source area to the copy destination area is received after the first copy request.

12. A copy controller for controlling a data copying operation wherein data is copied from a copy source area to a copy destination area, comprising:

storage means for storing copy control information indicating the copy source area to be copied and updated information indicating an updated section when a data update of the copy source area is generated after a first copy request is received and a first data copying operation from the copy source area to the copy destination area is activated; and processing means for initiating a second data copying operation wherein data is copied from the copy source area corresponding to the updated section to the copy destination area, based on a merged result of the copy control information and the updated information stored in the storage device, when the information indicating the updated section is recorded to the storage device and a second copy request which indicates a data copying operation from the copy source area to the copy destination area is received after the first copy request.

* * * * *

UNITED STATES PATENT AND TRADEMARK OFFICE
CERTIFICATE OF CORRECTION

PATENT NO. : 7,684,073 B2
APPLICATION NO. : 11/174493
DATED : March 23, 2010
INVENTOR(S) : Futoshi Watanabe et al.

It is certified that error appears in the above-identified patent and that said Letters Patent is hereby corrected as shown below:

Column 9, Line 13, change "undated" to --updated--.

Column 9, Line 20, change "undated" to --updated--.

Signed and Sealed this

Sixth Day of July, 2010

David J. Kappos
*Director of the United States Patent and Trademark Office*